United States Patent Office 3,492,124
Patented Jan. 27, 1970

3,492,124
DIGLYCIDYL ISOCYANURATE GELATIN HARDENERS
Manfred Jurgens, deceased, late of Berlin-Kopenick, Germany, by Lothar Richter, administrator, Berlin-Kopenick, Germany, and Heinz Priebe and Alfred Wende, Berlin, Germany, assignors to VEB Folochemische Werke Berlin, Berlin-Kopenick, Germany
No Drawing. Filed Aug. 31, 1966, Ser. No. 576,220
Int. Cl. G03c 1/30; C09h 5/00
U.S. Cl. 96—111         4 Claims

ABSTRACT OF THE DISCLOSURE

The present invention relates to gelatine layers containing hardeners which are 5-substituted 1,3-diglycidyl-iso-cyanurates of the formula

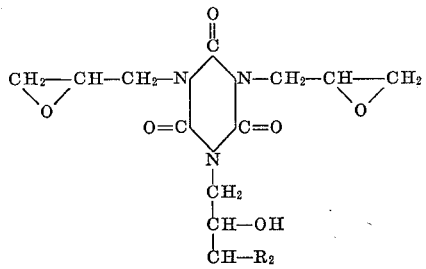

wherein R=—O—CO—R$_1$, —O—R$_1$, —SO$_3$—R$_1$,

—N(R$_1$)$_2$ and R$_1$ is an aliphatic, alicyclic, or aromatic radical which can be further substituted.

---

A variety of inorganic and organic hardening agents has been proposed heretofore for the hardening of photographic gelatine layers. Among them are bi- and trifunctional epoxides as described in a number of patents. Nevertheless, in spite of the great number of hardening agents cited in the literature, none of the polyfunctional epoxy compounds was entirely satisfactory.

The fact that the polyepoxide is supposed to react without delay with the gelatine, on the one hand, and should be as stable as possible against hydrolysis, on the other hand, is responsible for the prevailing difficulties.

The lack in stability to hydrolysis leads to the use of organic solvents, sometimes even poisonous ones or which at any rate will affect the photographic system in an undesirable manner. It is a further disadvantage that aqueous solutions, if used, can only be prepared shortly before use since even upon short storage the epoxide equivalent is subject to change, whereby the dosage necessary for optimum hardening effect will likewise have to be altered.

It is another factor which needs consideration that hydrolysis will not only occur at the oxyran ring, but also in other molecular groupings. Thus the pH shift in an aqueous solution of triglycidyl phosphate or the SiO$_2$ deposit with the use of glycidyl silicates is a consequence of undesirable hydrolysis.

The high reactivity of the epoxide group with many nucleophilic reaction partners also causes difficulties in preparation and purification procedures. Therefore, the attempt to prepare pure liquid or highly viscous monomers is frequently given up and pre-purification is done merely by making use of the distribution characteristics in different solvents, since incipient polymerization, e.g. during distillation, would lead to considerable losses in yield. The storage properties of the hardening agent ready for use has likewise some bearing on the above described properties. It is only then satisfactory when crystalline compounds are used. With other agents it will be necessary to provide special storage conditions.

Apart from the mentioned difficulties in preparing and applying of the hardening agents, photochemical and photographic differentiations should be observed.

It is known that several photochemically indifferent hardening agents, that is to say substances, which have no effect on the amount of developed silver, cause different sensitometric results, when materials of equal melting point are compared, or in other words that they affect the covering power of the silver in a different manner.

Furthermore, the known hardening agents are distinguished as regards their adhesiveness of the hardened emulsion layer with respect to the support. Thus, in choosing the proper hardening agent its behavior has to be taken into consideration as regards covering power of the developed silver on the film or plate and its adhesiveness to the support.

In a copending patent application, Ser. No. 415,802, filed Dec. 3, 1964, we have described a process for hardening gelatine with triglycidyl-iso-cyanurate. In further development it was found, that upon longer standing, crystal deposits may occur due to the poor solubility in water; this makes constant observation necessary during use.

It is an object to provide further improvement in the hardening of gelatine layers, by avoiding loss in covering power, a substantial range in dosage applied, improved water solubility, and stability to hydrolysis.

It was a further object of the invention to find cyanurates which would meet the above mentioned requirements.

The compounds of the following general formula have been found to satisfy the above requirements.

The hardening agents are 5-substituted 1,3-diglycidyl-iso-cyanurates of the formula

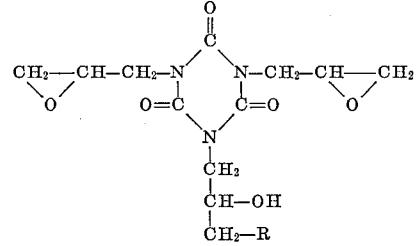

wherein R=—O—CO—R$_1$, —O—R$_1$, —SO$_3$—R$_1$,

—N(R$_1$)$_2$ and R$_1$ is an aliphatic, alicyclic, or aromatic radical which can be further substituted.

The preparation of the hardening agents according to the invention occurs by reacting 1,3,5-triglycidyl-iso-cyanurate, which can easily be obtained in pure state by reacting epichlorohydrin with cyanuric acid, with nucleophilic reaction partners having reactive hydrogen; such compounds are, e.g. alcohol, carboxylic acids, sulfoacids, secondary amines, and bisulfites. By this method, uniform, pure products are obtained which are distinguished by improved water solubility and increased stability to hydrolysis.

With these hardening agents several advantages can be realized. One considerable advantage is that the hardening agent will only slightly affect the covering power of the silver in the developed picture, as compared to the unhardened layer. The hardening agents are photochemically quite indifferent. They are used in aqueous solutions. When production conditions are maintained constant, including even temperatures and the maintenance of a certain humidity of the emulsion layer, it is possible to secure graded optimum melting points due to a wide range of dosage.

In the following the invention will be more fully described by an example, but it should be understood that this is given by way of illustration and not of limitation and that many changes in the details can be made without departing from the spirit of the invention.

EXAMPLE I

To a highly sensitive silver bromide-iodide emulsion in ammonia made slightly acidic to pH 6.5 and ready to pour, increasing amounts of a 5% aqueous solution of 1,3-diglycidyl-5-(γ-acetoxy-β-oxypropyl)iso-cyanurate are added. After pouring onto a support and drying, specimens were kept for 6 hours in an incubator at 60° C. and 60% relative humidity.

The test results are tabulated below:

| Ml./kg. emulsion hardening agent: | Melting point of the layer |
|---|---|
| 0 | 28 |
| 12 | 45 |
| 15 | 80 |
| 18 | 100 |

EXAMPLE 2

To a highly sensitive ready-to-pour silver bromide-iodide emulsion in ammonia made slightly acidic to pH 6.5, increasing amounts of a 5% aqueous solution of 1,3-diglycidyl-5-(γ-phenyl-β-oxypropyl)iso-cyanurate are added. After pouring onto a support and drying, specimens were kept for 6 hours in an incubator at 60° C. and 60% relative humidity.

The test results are tabulated below:

| Ml./kg. emulsion hardening agent: | Melting point of the layer |
|---|---|
| 0 | 28 |
| 12 | 45 |
| 15 | 75 |
| 18 | 96 |

EXAMPLE 3

To a highly sensitive ready-to-pour silver bromide-iodide emulsion in ammonia made slightly acidic to pH 6.5, increasing amounts of a 5% aqueous solution of 1,3-diglycidyl-5-(γ-phenylsulfonyl-β-oxypropyl)-iso-cyanurate are added. After pouring onto a support and drying, specimens were kept for 6 hours in an incubator at 60° C. and 60% relative humidity.

The test results are tabulated below.

| Ml./kg. emulsion hardening agent: | Melting point of the layer |
|---|---|
| 0 | 28 |
| 12 | 38 |
| 15 | 70 |
| 18 | 94 |

What is claimed is:

1. A photographic gelatin layer having distributed therethrough as hardening agent a 5-substituted 1,3-diglycidyl-iso-cyanurate of the formula

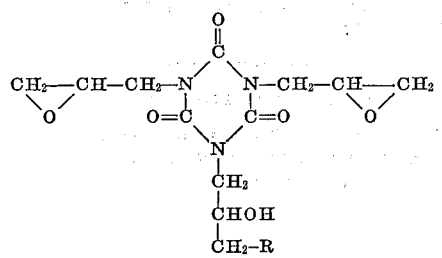

wherein R is selected from the group consisting of $-O-CO-R_1$, $-O-R_1$, $-SO_3-R_1$ and $-N(R_1)_2$, and wherein $R_1$ is selected from the group consisting of unsubstituted and substituted alicyclic and aromatic radicals.

2. Photographic gelatin layer according to claim 1 wherein said hardening agent is 1,3-diglycidyl-5-(γ-acetoxy-β-oxypropyl)-iso-cyanurate.

3. Photographic gelatin layer according to claim 1 wherein said hardening agent is 1,3-diglycidyl-5-(γ-phenyl-β-oxypropyl)-iso-cyanurate.

4. Photographic gelatin layer according to claim 1 wherein said hardening agent is 1,3-diglycidyl-5-(γ-phenylsulfonyl-β-oxypropyl)-iso-cyanurate.

No references cited.

NORMAN G. TORCHIN, Primary Examiner

JOHN H. RAUBITSCHEK, Assistant Examiner

U.S. Cl. X.R.

106—125